(12) United States Patent
Bernhart et al.

(10) Patent No.: US 11,433,526 B2
(45) Date of Patent: *Sep. 6, 2022

(54) POWER TOOL HAVING AN INTERMEDIATE HOUSING

(71) Applicant: Black & Decker Inc., New Britain, CT (US)

(72) Inventors: Ralf Bernhart, Idstein (DE); Martin Soika, Grosskrotzenburg (DE); Bruno Ruethers, Bad Camberg (DE)

(73) Assignee: Black & Decker Inc., New Britain, CT (US)

( * ) Notice: Subject to any disclaimer, the term of this patent is extended or adjusted under 35 U.S.C. 154(b) by 146 days.

This patent is subject to a terminal disclaimer.

(21) Appl. No.: 16/669,964

(22) Filed: Oct. 31, 2019

(65) Prior Publication Data

US 2020/0061798 A1    Feb. 27, 2020

Related U.S. Application Data

(63) Continuation of application No. 14/799,865, filed on Jul. 15, 2015, now Pat. No. 10,807,226.

(30) Foreign Application Priority Data

Jul. 23, 2014    (GB) .................................. 1413008

(51) Int. Cl.
*B23B 45/00* (2006.01)
*B25D 16/00* (2006.01)
(Continued)

(52) U.S. Cl.
CPC .............. *B25F 5/02* (2013.01); *B23B 45/001* (2013.01); *B25D 16/00* (2013.01); *B25D 17/00* (2013.01);
(Continued)

(58) Field of Classification Search
CPC ............ B23B 45/001; B25D 2250/065; B25D 2250/105; B25D 2250/121; B25F 5/008; B25F 5/02
(Continued)

(56) References Cited

U.S. PATENT DOCUMENTS 2,155,082 A * 4/1939 Decker ................. B23B 45/001
                                                              408/124
4,463,473 A * 8/1984 Nakada ..................... A47L 9/19
                                                              116/112
(Continued)

*Primary Examiner* — Thanh K Truong
*Assistant Examiner* — Patrick B Fry
(74) *Attorney, Agent, or Firm* — Amir R. Rohani

(57) ABSTRACT

A power tool is provided including a motor housing; a transmission housing disposed adjacent the motor housing with a gap therebetween; an electric motor including a rotor and a stator mounted within the motor housing; and an intermediate housing disposed between the electric motor and the transmission mechanism. The intermediate housing includes a back wall extending radially adjacent an axial end of the stator and having a through-hole therein through which the motor spindle extends; side walls extending axially from an outer circumference of the back wall internally of the motor housing; and one or more external walls extending substantially-radially outwardly from axial end of the one or more side walls to fill a gap formed between the transmission housing and the motor housing in the axial direction.

1 Claim, 4 Drawing Sheets

(51) Int. Cl.
*B25D 17/00* (2006.01)
*B25F 5/02* (2006.01)

(52) U.S. Cl.
CPC .. *B25D 2250/065* (2013.01); *B25D 2250/095* (2013.01); *B25D 2250/105* (2013.01); *B25D 2250/121* (2013.01)

(58) Field of Classification Search
USPC .............................................. 310/50, 52, 58
See application file for complete search history.

(56) References Cited

U.S. PATENT DOCUMENTS

| | | | | |
|---|---|---|---|---|
| 5,099,160 | A * | 3/1992 | Strozel | B23Q 11/0064 |
| | | | | 310/47 |
| 5,714,816 | A * | 2/1998 | Jensen | H02K 11/33 |
| | | | | 310/64 |
| 7,063,170 | B2 * | 6/2006 | Ortt | B25F 3/00 |
| | | | | 173/171 |
| 7,609,025 | B2 * | 10/2009 | Griffin | H02J 7/0027 |
| | | | | 310/50 |
| 8,113,922 | B2 * | 2/2012 | Esenwein | B25F 5/02 |
| | | | | 451/359 |
| 8,479,840 | B2 * | 7/2013 | Hartmann | B25F 5/008 |
| | | | | 173/168 |
| 9,718,180 | B2 * | 8/2017 | Hester | B25F 5/02 |
| 2012/0138325 | A1 * | 6/2012 | Esenwein | B24B 23/00 |
| | | | | 173/168 |
| 2013/0299207 | A1 * | 11/2013 | da Graca | B25F 5/008 |
| | | | | 173/171 |
| 2014/0338948 | A1 * | 11/2014 | Hester | B25F 5/02 |
| | | | | 173/217 |

* cited by examiner

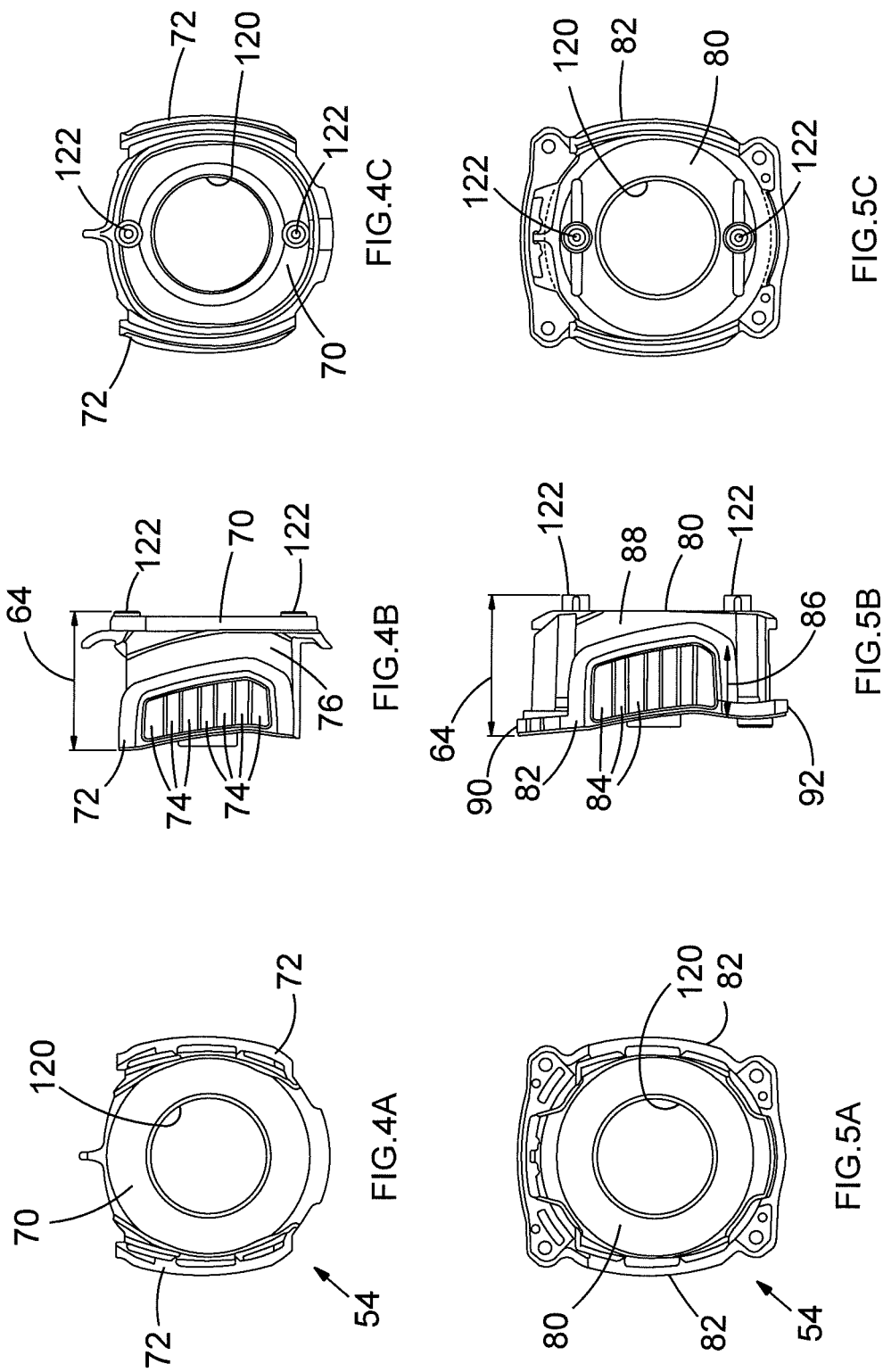

POWER TOOL HAVING AN INTERMEDIATE HOUSING

CROSS-REFERENCE TO RELATED APPLICATIONS

This application is a continuation of U.S. patent application Ser. No. 14/799,865 filed Jul. 15, 2015, entitled "Range of Power Tools," which claims priority to UK Application No. GB 1413008.2, filed on Jul. 23, 2014, entitled "A Range of Power Tools." The contents of these applications are incorporated herein by reference in their entireties.

FIELD OF THE INVENTION

The present invention relates to a range of power tools, in particular, a range of hammer drills.

BACKGROUND OF THE INVENTION

A hammer drill comprises a tool holder in which a cutting tool, such as a drill bit, can be supported and driven by the hammer drill. The hammer drill can often drive the cutting tool in three different ways, each being referred to as a mode of operation. The cutting tool can be driven in a hammering mode, a rotary mode and a combined hammer and rotary mode. A hammer drill will typically comprise an electric motor and a transmission mechanism by which the rotary output of the electric motor can either rotationally drive the cutting tool to perform the rotary mode or repetitively strike the cutting tool to perform the hammer mode or rotationally drive and repetitively strike the cutting tool to perform the combined hammer and rotary mode.

EP1157788 discloses a typical hammer drill.

SUMMARY OF THE INVENTION

An "in line" hammer drill comprises an electric motor having a rotor, which is rotationally mounted within a stator, which has an axis of rotation that is parallel to the axis of rotation of an output spindle. Such a hammer drill typically comprises a motor housing in which is located the electric motor and a transmission housing, in which is located the transmission mechanism which comprises a rotary drive mechanism and a hammer mechanism, and which is attached to the front of motor housing. "In line" drills are typically designed in a range, with each of the "in line" drills in the range having a different size electric motor to generate different power outputs. This results in each of the "in line" drill in the range having a different design of motor housing to accommodate the different sizes of electric motor which incurs cost and complexity when designing and manufacturing a range of "in line" drills. The present invention seeks to reduce these problems.

Accordingly, there is provided a range of power tools in accordance with claim 1.

BRIEF DESCRIPTION OF THE DRAWINGS

An embodiment of the present invention will now be described with reference to the accompanying drawings of which:

FIG. 4A to 4C show front sideways and rear views of the intermediate housing of the hammer drill of FIG. 1;

FIG. 5A to 5C show front sideways and rear views of the intermediate housing of the hammer drill of FIG. 2.

DETAILED DESCRIPTION

Whilst the embodiment of the present invention described below relates to an "in line" hammer drill, it will be appreciated that the invention is applicable to ranges of hammer drill having the electric motor in other orientations as well as ranges of other types of power tool, such as a range of drills or a range of reciprocating saws.

Figure 1:
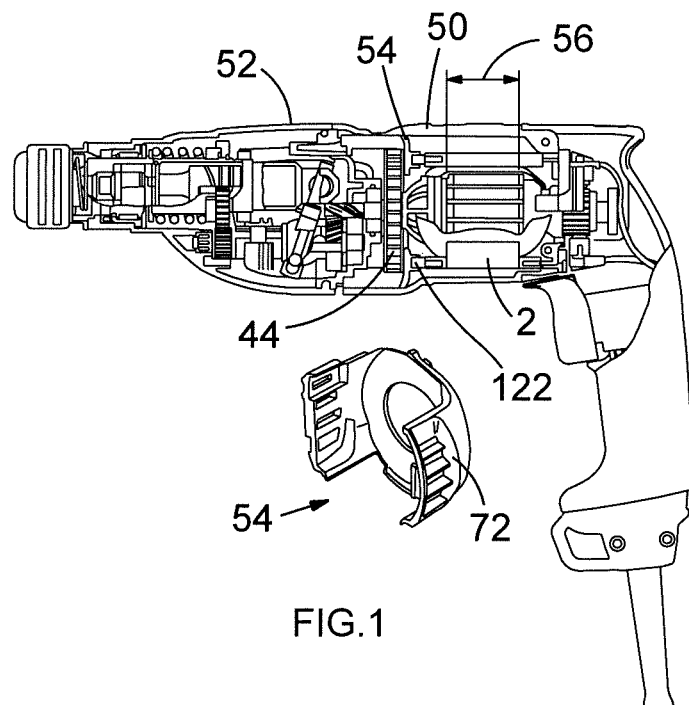
FIG. 1 shows a vertical cross sectional view of a first in line drill having a first motor size with a motor housing.
Figure 2:
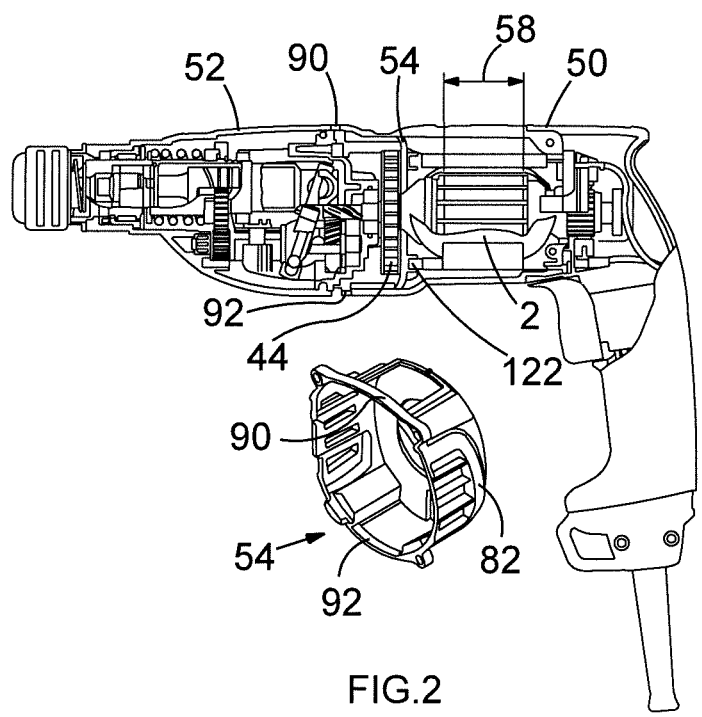
FIG. 2 shows a vertical cross sectional view of a second in line drill having a second motor size with the same motor housing as the hammer drill in FIG. 1.
Figure 3:
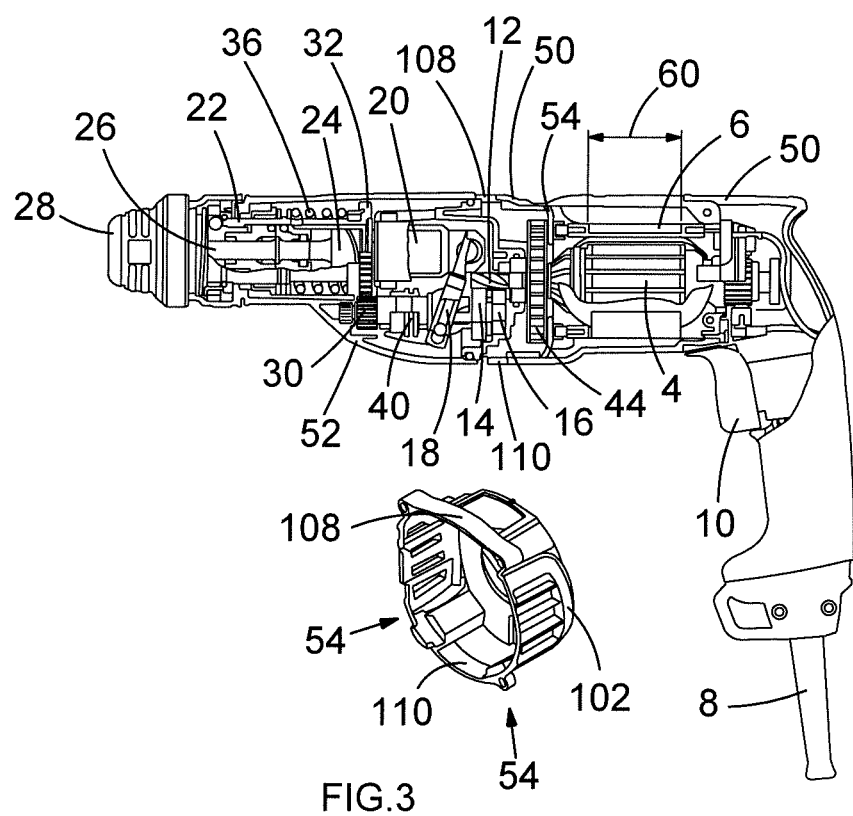
FIG. 3 shows a vertical cross sectional view of a second in line drill having a third motor size with the same motor housing as the hammer drill in FIG. 1.

FIGS. 1 to 3 each show a hammer drill, each of which forms part of a range of hammer drills.

Referring to the figures, each of the three drills are in line hammer drills which comprise an electric motor 2 having a rotor 4 mounted within a stator 6. The motor 2 is powered via an electric cable 8 which connects to the motor via an electric switch 10. Depression of the switch causes the rotor 4 to rotate. A fan 44 is mounted on the output spindle 12 of the motor to draw air over the motor 2.

The transmission mechanism will now be described.

The output spindle 12 of the motor comprises teeth which mesh with a gear 14 on an intermediate shaft 16 to rotatingly drive the intermediate shaft 16. A wobble bearing 18 is mounted on the intermediate shaft 16 which, when activated, is rotationally driven by the intermediate shaft 16 to reciprocatingly drive a piston 20 located within a hollow spindle 22. The piston reciprocatingly drives a ram 24 via an air cushion. The ram 24 in turn repetitively strikes a beat piece 26 which strikes the end of a cutting tool when held n a tool holder 28 attached to the end of the hollow spindle 22 at the front of the transmission. Also mounted on the intermediate shaft 16 is a second gear 30 which meshes with a third gear 32 mounted on the hollow spindle 22. When activated, the intermediate shaft 16 rotationally drives the hollow spindle 22 via the second and third gears, the third gear 32 driving the hollow spindle 22 via a torque clutch 36. Rotation of the hollow spindle 22 results in the rotation of the tool holder 28. The wobble bearing 18 and rotary drive are activated via a mode change mechanism 40. The operation of such a hammer drill is well known in art and therefore will not be discussed any further.

The electric motor 2 and switch 10 are located within a motor housing 50 which also forms a support handle by which the operator holds the hammer drill. The transmission mechanism comprising the hammer mechanism and rotary drive are located within a transmission housing 52 with the tool holder mounted on the front of the transmission housing 50. Sandwiched between the motor housing 50 and the transmission housing 52 is an intermediate housing 54.

The size of the motor 2 in each of three hammer drills in FIGS. 1 to 3 is different. This is due to the fact that the stack length of each of the motors is different. In FIG. 1, the motor 2 has a stack length 56 of 35 mm. In FIG. 2, the motor 2 has a stack length 58 of 40 mm. In FIG. 3, the motor 2 has a stack length 60 of 45 mm.

In each of the three hammer drills, the output spindle 12 of the motor projects into the intermediate housing 54 through an aperture 120. The fan 44 is mounted on the output spindle 12 inside of the intermediate housing 54, the intermediate housing 54 surrounding, at least in part, surrounding the fan 44. The intermediate section 54 acts as a fan baffle, guiding the air around the fan 44. The fan 44 used with all three hammer drills with the three motors 2 of different stack lengths is the same design. As such, the overall length of the intermediate housing 54 in each of the drills remains the same.

In each of the three hammer drills, the shape of the motor housing 50 is identical even though the sizes of the motors, due to varying stack lengths, vary. As the stack length of the three motors 2 increases within the same motor housing 50, the position of the intermediate housing 54 and fan 44 need to move forward relative to the motor housing 50. As the position of the fan 44 locates further forward, the transmission housing 52 then needs to be moved forward, relative to the motor 50 housing to enable the transmission mechanism to be positioned further forward. Therefore, different designs of intermediate housings 54 are used in each of the drills order to accommodate the different positions of the transmission housing 52. This results in the shape in the intermediate housings 54 changing with motors 2 having different stack lengths.

In the drill in FIG. 1, the motor housing 50 connects directly to the transmission housing 52. Therefore the first intermediate housing 54 (shown in FIGS. 4A to 4C) for this drill provides a back wall 70 as part of the fan baffle, two side grills 72 with apertures 74, which fit into an aperture formed between the transmission housing 52 and motor housing 50 through which air expelled from the rotating fan 44 can exit the hammer drill and two side walls 76 which locate internally of the entrance of the motor housing 50 and which act as part of the fan baffle.

In the drill in FIG. 2, which has a motor 2 with a greater stack length that that of FIG. 1, the motor housing 50 is connected via the intermediate housing 54 to the transmission housing 52 to enable the transmission housing 52 to be moved forward relative to the motor housing 50. Therefore, the second intermediate housing 54 (shown in FIGS. 5A to 5C) provides a back wall 80 as part of the fan baffle, two side grills 82 with apertures 84, the width 86 of which is larger than the grill 72 of the first intermediate housing 54 to accommodate the forward position of the transmission housing 52, which fit into gaps formed between the transmission housing 52 and motor housing 50 and through which air expelled from the rotating fan 44 can exit the hammer drill, two side walls 88 which are smaller than the walls 76 of the first intermediate housing 54 and which locate internally of the entrance of the motor housing 50 and which act as part of the fan baffle, and two external walls 90, 92 located at the top and bottom and which fill the gap between the motor housing 50 and transmission housing 52. The length of the external walls 90, 92 and the increase in the width of the grills 82 is the same as the increase in the stack length of the motor 2 compared with the stack length of the motor in FIG. 1, namely 5 mm.

Figure 6C:
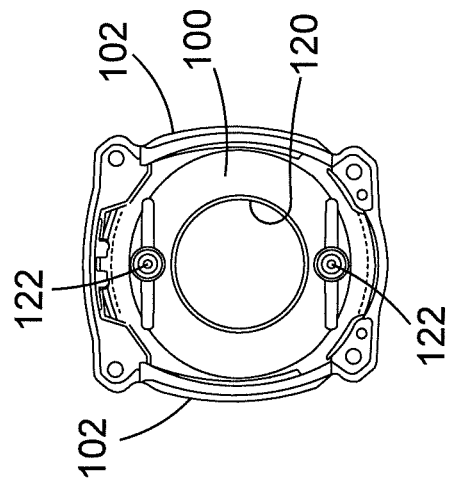
FIG. 6A to 6C show front sideways and rear views of the intermediate housing of the hammer drill of FIG. 3.
Figure 6B:
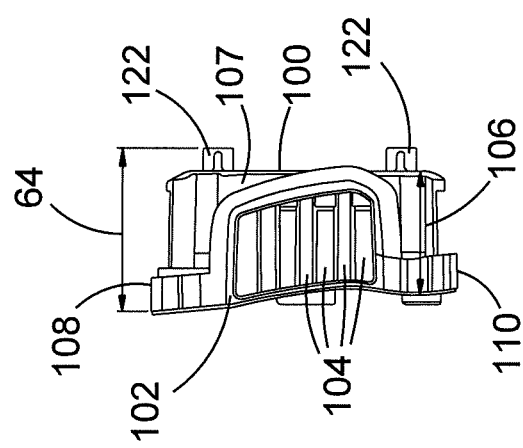
Figure 6A:
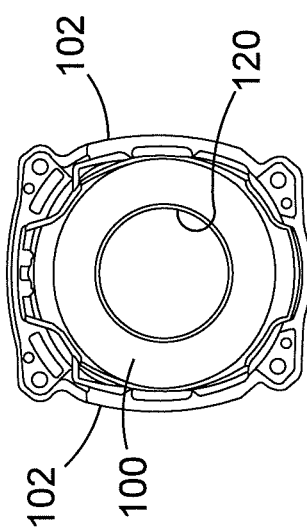

In the drill in FIG. 3, which has a motor 2 with a greater stack length that those of FIG. 1 or 2, the motor housing 50 is connected via the intermediate housing 54 to the transmission housing 52 to enable the transmission housing 52 to be moved even further forward relative to the motor housing 50. Therefore, the third intermediate housing 54 (shown in FIGS. 6A to 6C) provides a back wall 100 as part of the fan baffle, two side grills 102 with apertures 104, the width 106 of which is larger than the grills 72, 82 of the first and second intermediate housings 54 to accommodate the forward position of the transmission housing 54 and which fit into gaps formed between the transmission housing 52 and motor housing 50 and through which air expelled from the rotating fan 44 can exit the hammer drill, two side walls 107 which are smaller than those of the first and second intermediate housings 54 and which locate internally of the entrance of the motor housing 50 and which act as part of the fan baffle and two external walls 108, 110 located at the top and bottom between the motor housing 50 and transmission housing 52 which are longer in length than those of the second intermediate housing 54 and which fill the larger gap between the motor housing 50 and transmission housing 52. The length of the external walls 108, 110 and the increase in the width of the grills 102 is the same as the increase in the stack length of the motor 2 compared with the stack length of the motor in FIG. 2, namely 5 mm.

The cost of intermediate housing 54 is substantially less than that of the motor housing 50. Therefore the use of differing intermediate housing 54 to enable the same motor housing 50 to utilized on all of the hammer drills in a range decreases cost and increases simplicity. It also enables a standardized external look to be generated across the range.

The intermediate housings 54 also provide support for the front of the stator 6 of the motor 2 via two rubber supports 122 which connect between the rear of the rear walls 70, 80, 100 of the intermediate housings and the front end of the stators 6 of the motors 2.

During the normal operation of the three hammer drills, air is drawn in by the rotation of the fan 44 through vents 124 at the rear of the motor housing 52 and across the motor to cool it. The air is then drawn through the aperture 120 into the intermediate housing 54 and through the fan 44. It is then expelled through the side vents 74, 84, 104 formed in the side of the intermediate section 54 or an aperture 130 formed between the front of the intermediate housing 54 and the rear of the transmission housing 52 on the lower side of the drill.

In the hammer drills of FIGS. 1 and 2, the shape of the transmission housing 52 is identical whilst the shape of the transmission housing 52 of the hammer drill FIG. 3 is different to accommodate a larger transmission mechanism to drive a larger tool holder.

The invention claimed is:

1. A system comprising at least a first power tool and a second power tool, each of the first and second power tools comprising:
   a motor housing;
   a transmission housing disposed adjacent the motor housing with a gap therebetween;
   an electric motor mounted within the motor housing, the motor having a stator and a rotor driving a motor spindle;
   a transmission mechanism mounted within the transmission housing that uses the rotary output of the motor to drive a cutting tool; and
   an intermediate housing disposed between the electric motor and the transmission mechanism, the intermediate housing comprising:
      one or more side walls extending axially and located radially internally of the motor housing and being received through an entrance of the motor housing adjacent the axial end of the stator of the electric motor; and
      one or more external walls extending substantially-radially outwardly from the axial end of the one or more side walls to fill a gap formed between the transmission housing and the motor housing in the axial direction,
   wherein the motor housing and transmission housing of first power tool have the same length as the motor housing and transmission housing of the second power tool respectively, but the electric motor of the first power tool has a different length than the electric motor of the second power tool such resulting in different-size gaps between the motor housing and transmission housing in the first power tool and the second power tool, and wherein a size of the one or more external walls of the intermediate housing of the first power tool is different than a size of the one or more external walls of the intermediate housing of the second power tool.

* * * * *